United States Patent Office 2,817,132
Patented Dec. 24, 1957

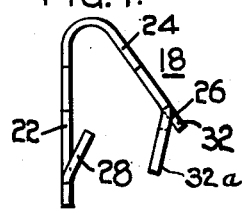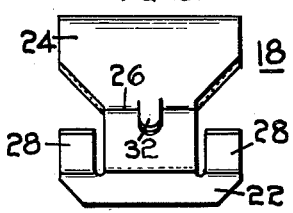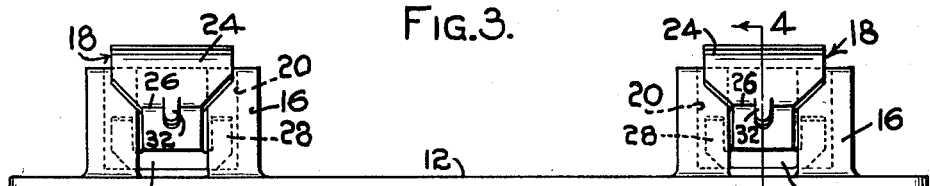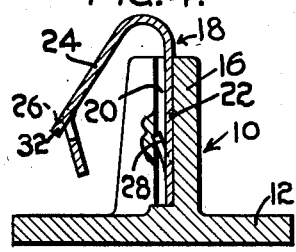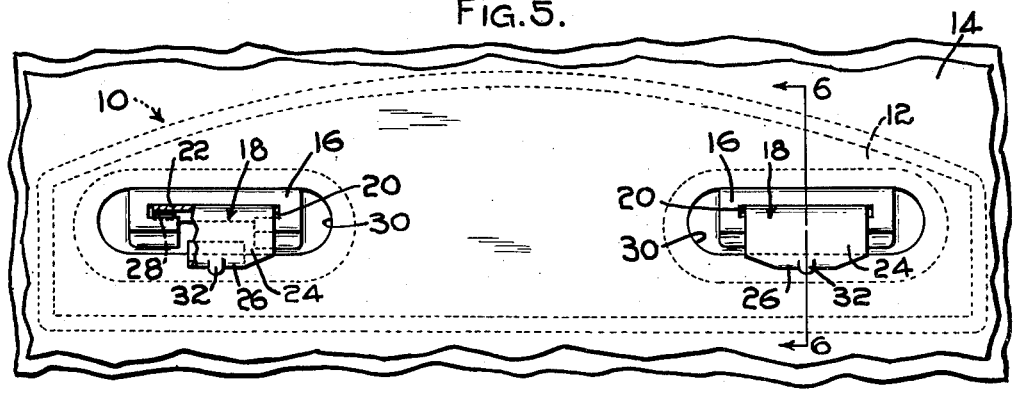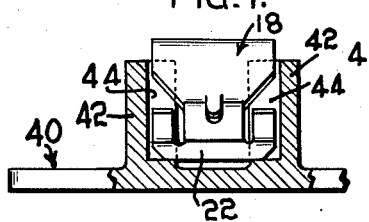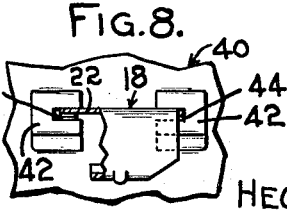
INVENTOR:
HECTOR D. PETRI,
BY Robert E. Ross
ATTORNEY.

2,817,132

FASTENING DEVICE FOR SECURING AN ARTICLE TO AN APERTURED SUPPORT

Hector D. Petri, Framingham, Mass., assignor to United-Carr Fastener Corporation, Cambridge, Mass., a corporation of Delaware Application February 4, 1955, Serial No. 486,179

4 Claims. (Cl. 24—73)

This invention relates generally to fastener installations and has particular reference to an assembly for securing an article to an apertured support.

In the assembly of automobiles and certain household appliances, it is necessary to secure certain metal or plastic articles, such as ornamental name plates, trim strips or the like, to an apertured panel.

It has been common in the past to provide means on the rear surface of the article to engage a shouldered fastening device for snapping engagement with a support panel opening. However, such devices have proved unsatisfactory in many applications in providing insufficient holding power, or insufficient draw-down, or are not adaptable to variations in the size of the support panel aperture, resulting in looseness of the secured article.

The object of the invention is to provide a fastener installation which avoids the above disadvantages and is adapted to securely attach an article to a support panel.

A further object of the invention is to provide a fastener installation in which an integral stud protruding from the rear of the article to be attached is provided with an axial aperture to receive the attaching member.

Other objects of the invention will, in part, be obvious, and will in part, appear hereinafter.

In the drawing:

Fig. 1 is a view in end elevation of an attaching member for use in a fastener installation embodying the features of the invention;

Fig. 2 is a view in side elevation of the attaching member of Fig. 1;

Fig. 3 is a view in side elevation of a fastener assembly embodying the features of the invention;

Fig. 4 is a view in section taken on line 4—4 of Fig. 3;

Fig. 5 is a rear view of a support panel having the assembly of Fig. 3 attached thereto;

Fig. 6 is a view in section taken on line 6—6 of Fig. 5;

Fig. 7 is a view in elevation of a modified form of fastener assembly embodying the features of the invention; and Fig. 8 is a top plan view of the assembly of Fig. 7.

Referring to the drawing, there is illustrated a fastener assembly 10, which comprises an article 12 for attachment to a panel 14 supported by a frame or supporting member 14a, an integral stud 16 extending from the rear side of the article, and an attaching member 18 assembled with the stud.

The stud 16, in the illustrated embodiment, is transversely elongated and is provided with an elongated slot 20 which extends substantially the full length of the stud.

The attaching member 18 is generally U-shaped, and is provided with a substantially straight leg 22 for assembly into the slot 20 and an inclined leg 24 having a shoulder 26 formed thereon. The lower portion 32a of the inclined leg 24 is angularly bent inwardly in the direction of the straight leg 22 from the point of formation of the shoulder 26.

The leg 22 is provided with tangs 28 which are inclined outwardly therefrom and away from the end of the leg in the direction of the inclined leg 24, and the over-all thickness of the leg 22 and tangs 28 is greater than that of the slot 20, so that when the leg 22 is inserted into the slot the tangs 28 bite into the surface thereon to prevent retraction of the leg from the slot.

After such assembly, the shouldered leg 24 is disposed alongside the stud and extends generally toward the base thereof with the shoulder 26 extending laterally outwardly from the stud to enable the leg to snap into engagement into a panel opening 30. If desired, a locking tab 32 may be provided at the shoulder to prevent removal of the device from the panel once it has been snapped into place.

Referring now to Figs. 7 and 8, there is illustrated a modification of the invention in which the attaching member 18 is assembled with a device 40 by means of a pair of stud portions 42 which project outwardly from the surface thereof in spaced relation to each other, and are provided with opposing slots 44 to receive the side edges of the leg 22. The method of assembly of the attaching member and its operation are identical to that hereinbefore described.

Either of the above described modifications have the advantage that transverse forces applied to the article are resisted by the integral studs without affecting the holding power of the attaching member.

Since certain other obvious modifications may be made in this device without departing from the scope of the invention, it is intended that all matter contained herein be interpreted in an illustrative and not in a limiting sense.

I claim:

1. In a fastener installation having an article for attachment to an apertured support, said article having a base member and an integral elongated stud member secured at substantially right angles thereto for entering the aperture of said support, said stud member having an elongated slot which opens to the free end of the stud, and an attaching member; the improvement of an attaching member comprising a first leg portion adapted to be disposed in the slot of said stud in longitudinal alignment therewith, said first leg member having inclined means adjacent its lower end for engaging the slotted inner surface of said stud, and a second leg member integrally secured to the opposite free end of said first leg member and angularly disposed downwardly therefrom and in a direction away from the plane of said first leg member, the bottom free end of said second leg member being inclined downwardly therefrom and in the direction of said first leg member for resiliently engaging the panel aperture for snapping engagement therewith.

2. A fastener installation in accordance with claim 1 wherein the second leg member is provided with a locking tab to the point of inclination of the bottom free end of the second leg portion to prevent the accidental displacement of the second leg member from the apertured opening.

3. A fastener installation in accordance with claim 1 in which the inclined means of said first leg member are two in number and disposed on opposite sides thereof.

4. In a fastener installation having an article for attachment to an apertured support, said article having a base member on a pair of laterally spaced stud portions protruding therefrom at substantially right angles thereto for entering the aperture of said support, said stud portions having opposed elongated slots which open to the free end of the studs, and an attaching member; the improvement of an attaching member comprising a first leg portion, the opposite side edges being adapted to be disposed in the slots of each of said studs in longitudinal alignment therewith, each of said leg members having inclined members adjacent each lower end for engaging the slotted inner surface of each of said studs, and a second leg member integrally secured to the opposite free end of said first leg member by a reverse bend portion and angularly disposed downwardly therefrom in a direction away from the plane of said first leg member, the bottom free end of said second leg member being inclined downwardly therefrom and in the direction of said first leg member for resiliently engaging the panel aperture for snapping engagement therewith.

References Cited in the file of this patent

UNITED STATES PATENTS

| | | |
|---|---|---|
| 2,515,827 | Howard | July 18, 1950 |
| 2,537,930 | Hall | Jan. 9, 1951 |
| 2,692,414 | Poupitch | Oct. 26, 1954 |
| 2,695,806 | Balint | Nov. 30, 1954 |